United States Patent [19]  [11] 3,907,939
Robin et al.  [45] Sept. 23, 1975

[54] PHOSPHITE ESTERS OF HINDERED PHENOLS

[75] Inventors: Michael Robin, Colonia; Sheldon R. Schulte, Highland Park, both of N.J.

[73] Assignee: Ashland Oil, Inc., Ashland, Ky.

[22] Filed: June 16, 1969

[21] Appl. No.: 833,806

[52] U.S. Cl............ 260/953; 260/45.7 P; 260/923; 260/936; 260/941; 260/944; 260/945; 260/949; 260/951
[51] Int. Cl.² ..................... C07F 9/145; C08K 5/53
[58] Field of Search ..................................... 260/953

[56] References Cited
UNITED STATES PATENTS

| | | | |
|---|---|---|---|
| 3,297,631 | 1/1967 | Bown et al. | 260/953 X |
| 3,386,952 | 6/1969 | Gleim et al. | 260/953 X |
| 3,510,507 | 5/1970 | Bown et al. | 260/953 X |

*Primary Examiner*—Anton H. Sutto

[57] ABSTRACT

Reaction products of a phosphite ester-forming compound such as a phosphorous trihalide and a hindered bis phenol are obtained. Such products are useful as antioxidants in various compositions and materials.

8 Claims, No Drawings

PHOSPHITE ESTERS OF HINDERED PHENOLS

BACKGROUND OF THE INVENTION

This invention relates to novel phosphite esters. More particularly, it relates to reaction products of phosphite ester-forming phosphorous compounds and hindered bis phenols.

Synthetic polymers such as polyethylene, rubber, waxes, oils, fats and numerous other compounds are attacked by oxygen and eventually may become useless for their intended purpose. The chemical reaction by means of which oxygen attacks and degrades the compounds is a free radical chain reaction. Free radicals are produced by abstraction of hydrogen atoms from the molecules of the compounds by light, heat, mechanical action, active molecules, and the like.

The free radicals are extremely reactive in the presence of air and oxygen, forming peroxide radicals, which, in turn, abstract hydrogen atoms from the molecules to form additional radicals. These again react with oxygen in the same manner. Thus, once started, the reaction is a self-perpetuating, degradative, continuous chain reaction until stopped. In order to prevent such degradation, various antioxidants have been added which react with and destroy the intermediate chemical-free radicals, as they form, without producing equally reactive intermediates.

Various phosphorous-containing compounds and various phenols such as 2,2'-methylenebis-(6-tert.butyl-4-methylphenol) have been used as antioxidants; however, the prior antioxidants have the disadvantage of losing effectiveness at comparatively high temperatures, even when used in synergistic combinations. Continuing work is therefore being done to obtain compounds with improved antioxidant properties. We have found that the novel compounds of our invention surprisingly and unexpectedly exhibit increased stabilizing properties; and thereby the quantity necessary to achieve a desired level of stabilization at such temperatures as are normally used for molding, calendaring, extrusion and other forming processes is reduced. Moreover, with the novel compounds of our invention, substantial degrees of stabilization can be attained at those higher temperatures at which combinations of phosphorous compounds separate and bis phenolic compounds are ineffective.

BRIEF DESCRIPTION OF THE INVENTION

The novel compounds of this invention are phosphite esters in which at least one of the available bonds on the phosphorous atom is connected to a para-substituted hindered phenol through the oxygen remaining after the removal of the hydrogen of a phenolic hydroxyl group. The para-substituted hindered phenol is a hindered bisphenol with the two phenolic rings bridged through a saturated aliphatic hydrocarbon linkage, and with at least one hydroxyl group on each ring being ortho or para to the saturated aliphatic hydrocarbon linkage, and with both of the positions ortho to the OH group on each ring being substituted with bulky hydrocarbon groups of at least one carbon atom. The term "para-substituted hindered" means that all positions ortho and para to the OH group on each ring of the hindered bisphenol are substituted. All available bonds on the phosphorous atom are connected to a hindered phenolic compound through the oxygen remaining after removal of the hydrogen of the phenolic hydroxy group.

The novel compounds of our invention may constitute, for instance, the reaction products of about one reacted mole of a phosphite ester-forming phosphorous compound and at least one reacted mole and preferably three reacted moles of a para-substituted hindered phenol, and if necessary, at least one other hindered phenolic compound in an amount so that each of the available bonds on the phosphorous atom is connected to a hindered phenol through the oxygen remaining after the removal of the hydrogen of a phenolic hydroxyl group. The para-substituted hindered phenol is a hindered bisphenol with the phenolic rings bridged through a saturated aliphatic hydrocarbon linkage, and with at least one hydroxyl group on each ring being ortho or para to the linkage, and with both of the positions ortho to said at least one hydroxyl group on each ring substituted with a bulky hydrocarbon group of at least one carbon atom. The term "para-substituted hindered" means that all positions ortho and para to the OH group on each ring of the phenol are substituted.

The reaction products are formed under known phosphite ester-forming conditions of time and temperature with known catalysts.

The production of the novel compounds or reaction products of our invention was unexpected since it was generally believed heretofore among those of ordinary skill in the art that the hydroxyl groups in fully hindered phenols such as one used herein, are virtually unreactive and cannot be converted to various derivatives by normal techniques. For example, this low reactivity of hindered phenols is discussed in Kirk and Othmer, *Encyclopedia of Chemical Technology*, Vol. 1, pages 902 and 906. Indeed, it is quite surprising and unexpected that the hindered phenols used herein react with the phosphorous compounds under normal phosphite ester-forming conditions.

DESCRIPTION OF PREFERRED EMBODIMENTS

The phosphorous compounds used in preparing the compounds of our invention can be any of the known phosphite ester-forming compounds. Examples of such compounds are the phosphorous trihalides, such as the chloride, bromide, and iodide. The most preferred phosphorous compound is phosphorous trichloride.

The para-substituted hindered phenol compounds are represented by the following formula:

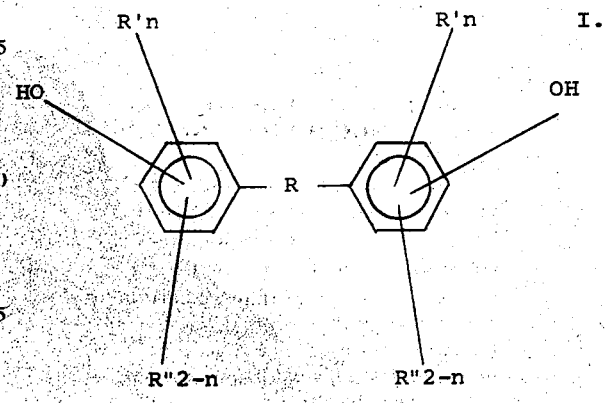

R is a saturated aliphatic hydrocarbon linkage or group (alkylidenes and alkylenes) having 1-8 carbon atoms, and preferably having 1-4 carbon atoms. More preferably, R can be methylene, ethylene, isopropylene, ethylidene, n-propylidene, and isopropylidene. The most preferred R group is methylene.

The OH group on each ring is either ortho or para to the hydrocarbon linkage and is most preferably in the ortho position.

Each R' individually is a bulky hydrocarbon group of at least one carbon atom and is ortho to the OH group on each ring. Usually the bulky hydrocarbon group is free of non-benzenoid unsaturation. R' is preferably a bulky hydrocarbon group of from 1-22 carbon atoms such as methyl, ethyl, t-butyl, t-amyl, t-hexyl, cyclohexyl, t-pentyl, t-octyl, phenyl, naphthyl, αmethylcyclohexyl, nonyl, benzyl, methyl, isobornyl, anthranyl, phenanthranyl, norbornyl, cyclopropyl, cyclopentyl, bicyclohexyl, cyclobutyl, 1,2-dimethylcyclopropyl, and xylyl, more preferably R' is a bulky hydrocarbon of from 1-12 carbon atoms, and even more preferably is an alkyl group containing 1-12 carbon atoms of which t-butyl is the most preferred.

$n = 1$ or $2$ $R''$ is any substituent which will occupy the position para to the OH group on each ring, when it is unfilled, in order to prevent the reactants from combining through said para position. $R''$ advantageously is, but is not limited to, a hydrocarbon group, such as the hydrocarbon groups set forth above for $R'$, or a halide group such as chlorine or bromine; or $-NO_2$; or $-SR'''$; or $-OR'''$; or $-COOR'''$; or $-NR'''R'''$; or $-NRH^{IV}$ NH; or $-NHOH$; $-NHR^{IV}$ OH; wherein $R'''$ is H or a hydrocarbon group as defined above for $R'$, and $R^{IV}$ is an alkylene group of 1-22 carbon atoms and preferably of 1-12 carbon atoms. Such specific $-SR'''$ groups are $-SH$; $-SCH_3$; $-SC_2H_5$; $-SC_9H_{19}$; $-SC_6H_5$; and $-SC_6H_{11}$. Some specific $-OR'''$ groups are $-OH$; $-OC_6H_5$; $-OC_6H_{11}$; $-OCH_3$; $-OC_2H_5$; and $-OC_9H_{19}$.

Some specific $-COOR'''$ groups are $-COOH$; $-COOC_2H_5$; $-COOC_9H_{19}$; $-COOC_6H_5$; $-COOC_6H_{11}$; and $-COOCH_3$.

Some specific $-NR'''R'''$ groups are $-NH_2$; $-NHCH_3$; $-N(CH_3)_2$;

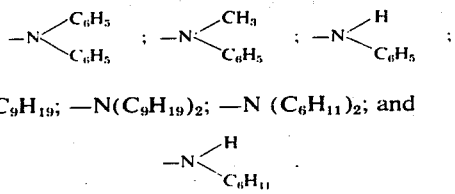

$-NHC_9H_{19}$; $-N(C_9H_{19})_2$; $-N(C_6H_{11})_2$; and $-N\begin{matrix}H\\C_6H_{11}\end{matrix}$ Some specific $-NHR^{IV}NH_2$ groups are $-NHCH_2NH_2$; $-NHC_2H_4NH_2$; $-NHC_9H_{18}NH_2$; and $-NHC_6H_{12}NH_2$.

Some specific $-NHR^{IV}OH$ groups are $-NHCH_2OH$; $-NHC_2H_4OH$; $-NHC_9H_{18}OH$; and $-NHC_6H_{12}OH$.

$R''$ preferably is an alkyl group containing at least one carbon atom with methyl being the most preferred. Usually alkyl groups of not more than 22 carbon atoms are employed. Advantageously, the alkyl group contains 1-12 carbon atoms.

Specific examples of suitable bisphenols are 4,4'-methylenebis-(2,6-dimethylphenol); 2,2'-methylenebis-(4-ethyl-6-tert.-butylphenol); 2,2'-methylenebis-(4-chloro-6-tert.-butylphenol); 2,2'-methylenebis-(4,6-ditertiarybutylphenol); 2,2'-methylenebis(4,6-dimethylphenol); 2,2'-isopropylidene bis-(4,6-ditertiarybutylphenol); 2,2'-methylenebis-(6-nonyl-4-methylphenol); 2,2'-ethylidene bis-(4,6-ditertiarybutylphenol); and 4,4'-methylenebis-(2,6-ditertiarybutylphenol). The preferred para-substituted hindered phenol is 2,2'-methylenebis-(4-methyl-6-tertiarybutylphenol).

The other hindered phenol is a mono- or polyphenolic compound which may be either a hydroxy substituted phenol, or a phenol with at least two of the positions ortho and para to the hydroxy group on each phenolic ring being substituted with the appropriate ortho and/or para substituents as defined above for the para-substituted hindered phenol.

Suitable examples of the hydroxy substituted phenol are catechol, resorcinol, and hydroquinone. Suitable examples of a phenol with at least two of the positions ortho and para to the hydroxyl group on each phenolic ring being substituted are 2-tertiarybutyl-4-methylphenol; 2-tertiarybutyl-4-chlorophenol; 2,6-dimethylphenol; 2,6-ditertiarybutyl-4-methylphenol; 4,4-bis-(2,6-ditertiarybutylphenol); 2,4,6-trimethylphenol; and 2-methyl-4-n-butylphenol.

The catalyst used in preparing the phosphorous compounds of our invention can be any of the conventional catalysts used in preparing phosphite esters. Examples of suitable catalysts are metals such as copper powder, iron filings, calcium, aluminum, and magnesium; halides such as aluminum chloride, magnesium chloride, ferric chloride, tin tetrachloride, zinc chloride, boron trifluoride, titanium trichloride, and titanium tetrachloride; sulfates such as copper sulfate; and oxides such as magnesium oxide and copper oxide. The preferred catalyst is magnesium. The amount of catalyst is usually present in amounts between 0.5% and 5% by weight, based on the weight of the phenolic compounds.

The diluent can be any liquid, provided it is inert (not reactive in any manner which will harm the reaction or the product), and should dissolve at least one of the reactants. Examples of suitable solvents are the chlorinated hydrocarbons. The preferred solvent is o-dichlorobenzene. The quantity of diluent is most commonly present in amounts between 5% and 300% by weight, based on the weight of the phenolic compounds.

The process is not limited to specific reaction temperatures, since the reaction can be carried out over a wide range of temperatures. For example, the process can be carried out at temperatures of from about 0°C. to temperatures of about 200°C. The preferred temperature range varies from about 150°C. to 200°C., and the most preferred temperature range is from about 160°C. to 170°C. Also the process is not limited to any specific reaction time, since the time required will vary, primarily dependent upon the particular reactants, temperatures, and catalysts. Preferably, the reaction times vary from about 12 to about 72 hours. About 24 hours is the reaction time which is most commonly used.

Atmospheric pressure is the most commonly used pressure for carrying out the invention. Of course, higher or lower pressures can be employed when desired.

Some of the novel phosphite esters of the invention are illustrated by the following structures:

II.
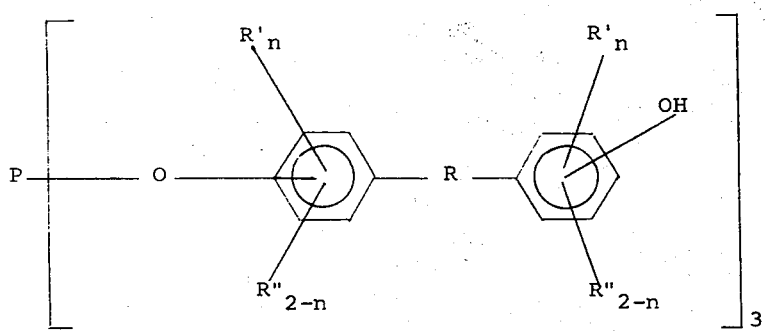
III.
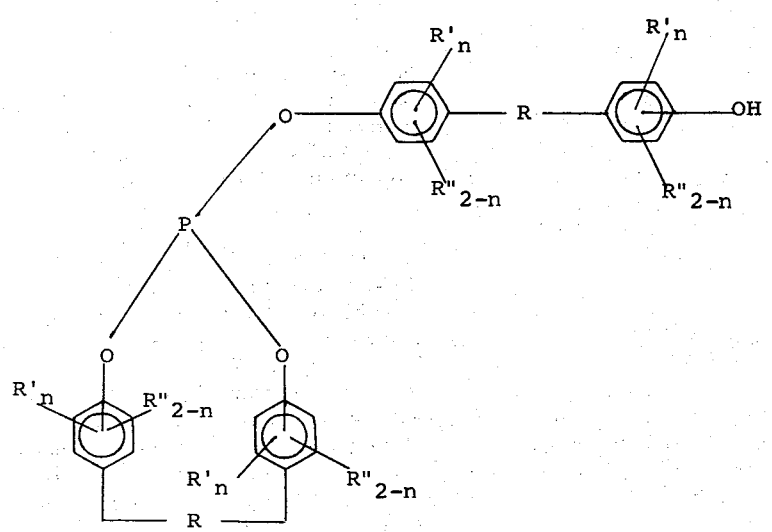
IV.
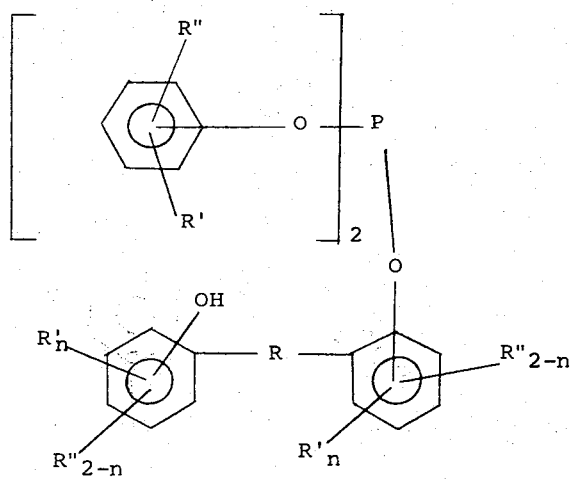

v.

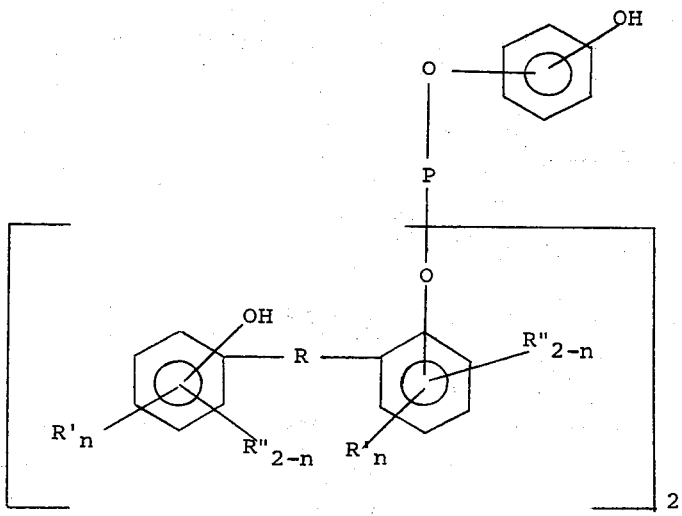

wherein R, R', and R'' and n have the same definitions and positions set forth in respect to Formula I.

The phosphorous compounds of the invention are useful as antioxidants in a wide variety of materials. Among such materials are synthetic polymers, rubber, waxes, fats and oils. Among the synthetic polymers which can be stabilized with the products of this invention are: polyolefins such as polyethylene, polypropylene and polybutene; diene rubbers such as polyisoprene, polybutadiene, copolymers of conjugated dienes and at least one other copolymerizable monomer such as styrene, acrylonitrile, methyl acrylate, and 2-vinyl pyridine, polystyrene; polyacrylates; polyesters; epoxies; polyacetals; vinyl chloride polymers; polyurethanes and others. The products of this invention are particularly effective in stabilizing polyolefins, e.g. polypropylene and polyethylene. The amount of antioxidant needed to stabilize a particular amount of polymeric material can obviously be varied over a wide range of proportions dependent upon the identity of the specific polymeric material, the desired degree of stabilization, and the environment in which the material is to be used. An amount of about 0.1% by weight based upon the anti-oxidant and the material to be stabilized is very effective. The threshold at which the compounds of the invention are effective is about 0.001% by weight based upon the weight of material to be stabilized. The compounds of the invention are used in amounts as high as 5% by weight or higher based upon the weight of the material to be stabilized.

The compounds of this invention have exhibited performance superior to the prior art antioxidants to which they have been compared as will be illustrated in the following non-limiting examples, in which all parts are weight unless the contrary is stated.

EXAMPLE 1

To a mixture of 3 moles of 2,2'-methylenebis (4-methyl-6-tertiarybutylphenol), 3900 parts of o-dichlorobenzene, as an inert solvent, and about 4 moles of a magnesium metal catalyst in a glass-lined container or flask equipped with a glass-surfaced stirrer or agitator is added all at once and with agitation, 1 mole of phosphorous trichloride. The resultant mixture is agitated for 24 hours at a pressure of about one atmosphere with the temperature being maintained between 160° and 170°C. Hydrogen chloride gas evolves as the reaction proceeds and is neutralized in a scrubbing device. The reaction mixture is cooled, 1000 parts of water are added and the magnesium catalyst is separated by filtration. The clarified mixture is then neutralized to a pH between 6 and 8 by use of an aqueous sodium carbonate solution and after washing with 1000 parts of water, the organic portion is then separated from the aqueous portion of the mixture. The reaction product and inert solvent are then separated by vacuum distillation. The reaction product is a clear, friable glass melting between 59° and 64°C., and has the following structure as determined by elemental analysis and IR spectra:

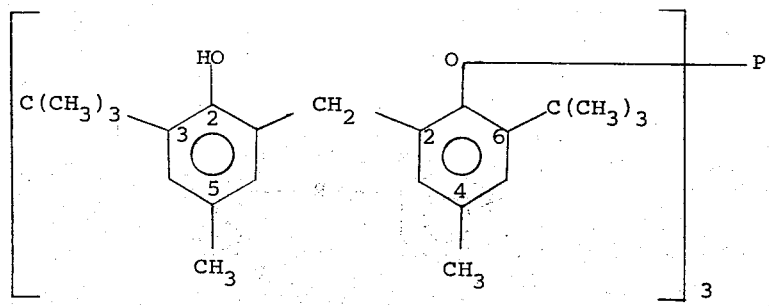

tris [2-(2-hydroxy-3-t-butyl-5-methylbenzyl)-4-methyl-6-t-butylphenyl] Phosphite

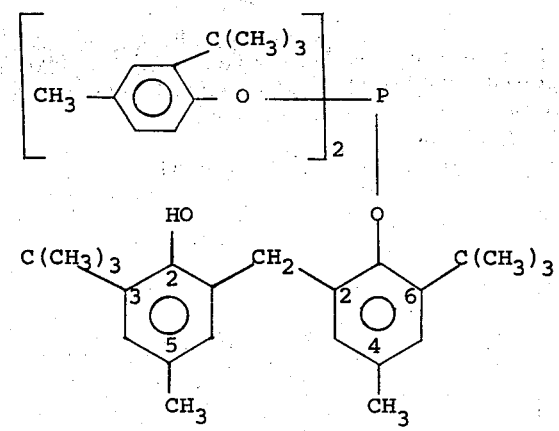

EXAMPLE 2

To a mixture of 2 moles of 2-tertiarybutyl-4-methylphenol, 1 mole of 2,2'-methylenebis (4-methyl-6-tertiarybutylphenol), 3900 parts of o-dichlorobenzene, as an inert solvent, and 0.4 moles of a magnesium metal catalyst in a glass-lined container or flask equipped with a glass-surfaced stirrer or agitator is added all at once and with agitation, 1 mole of phosphorous trichloride. The resultant mixture is agitated for 24 hours at a pressure of about one atmosphere with the temperature being maintained between 160° and 170°C. Hydrogen chloride gas evolves as the reaction proceeds and is neutralized in a scrubbing device. The reaction mixture is cooled, 1000 parts of water are added and the magnesium catalyst is separated by filtration. The clarified mixture is then neutralized to a pH between 6 and 8 by use of an aqueous sodium carbonate solution. The organic portion of the mixture is then washed with 1000 parts of water, and an organic layer is then separated from the aqueous portion of the mixture. The reaction product and inert solvent are then separated by vacuum distillation. The reaction product, di [(2-tertiarybutyl-4-methylphenyl), mono (2-(2-hydroxy-3-tertiarybutyl-5-methylbenzyl)-4-methyl-6-tertiarybutylphenyl] phosphite, has the following structure as determined by elemental analysis and IR spectra:

EXAMPLE A

The product of Example 1 is admixed with a polyethylene of 0.960 density and approximately 300,000 molecular weight in a steel container and the mixture is extruded twice at 300°F. The concentration of the product of Example 1 is then adjusted to 0.1% by weight of the polymer by the addition of more of the polyethylene and the mixture is again extruded twice at 300°F. The resulting polyethylene composition is then pressed into a 6–6.5 mil film at 310°F and 1280 psi on a 10-inch hydraulic ram press. Likewise, a film of the same polyethylene without any antioxidant and a film of the same polyethylene containing 0.1% by weight of some other antioxidants are prepared by the method set forth above. The resulting films are then subjected to 125° ± 1°C. in a forced draft oven. The absorbance in the carboxyl region of the IR Spectrum (5.8 Angstroms) is then recorded after periods of exposure. When the observed absorbance reaches 94%, the sample is considered to be "oxidized", and the time of exposure to reach this point is recorded in the table below:

| Additive | Amount | Time in Hrs. to reach 94% Absorbance |
| --- | --- | --- |
| None |  | 50 |
| 2,2' Methylenebis (6-t-butyl-4-methylphenol) | 0.1% | 125 |
| Reaction product of Example 1 | 0.1% | 320 |
| Reaction product of Example 2 | 0.1% | 173 |
| [tris(2-t-butyl-4-methylphenyl) phosphite structure] | 0.1% | 60 |
| [tris(2-t-butyl-4-chlorophenyl) phosphite structure] | 0.1% | 60 |
| [methylenebis phenol structure] | 0.1% | 74 |
| [phosphite diester structure] | 0.1% | 90 |

From the above table, it is readily apparent that the phosphite esters of the invention exhibit greatly improved stabilizing properties as compared to stabilizers outside the scope of the invention.

What is claimed is:

1. A phosphite ester of the formula:

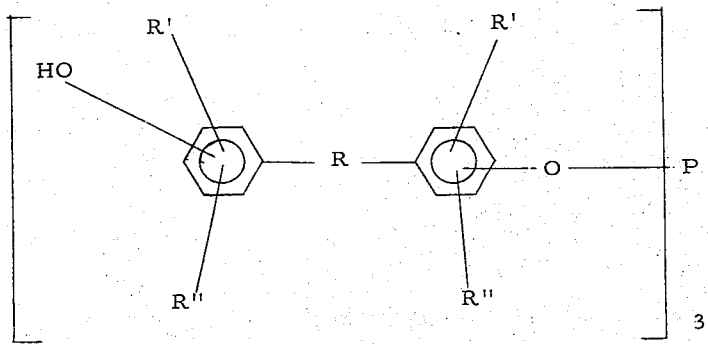

wherein R is a saturated aliphatic hydrocarbon linkage (alkylidenes and alkylenes) having 1–8 carbon atoms, the OH group on each ring is either ortho or para to R, each R' represents the same or different alkyl, cycloalkyl or aryl groups of 1–22 carbon atoms ortho to the OH group on each ring, each R" represents the same or different alkyl, cycloalkyl or aryl groups of 1–22 carbon atoms para to the OH group on each ring if R does not occupy such position and is ortho to the OH group on each ring if R is in the para position to the OH group.

2. A phosphite ester in accordance with claim 1 wherein R' and R" are alkyls of 1 to 12 carbon atoms.

3. A phosphite ester in accordance with claim 2 wherein the R is an alkylene of 1 to 4 carbon atoms.

4. A phosphite ester in accordance with claim 3 wherein the OH group on each ring is ortho to R.

5. A phosphite ester in accordance with claim 4 wherein R' is ortho to the OH group on each ring and is a tertiary butyl group.

6. A phosphite ester in accordance with claim 5 wherein R is methylene.

7. A phosphite ester of the formula

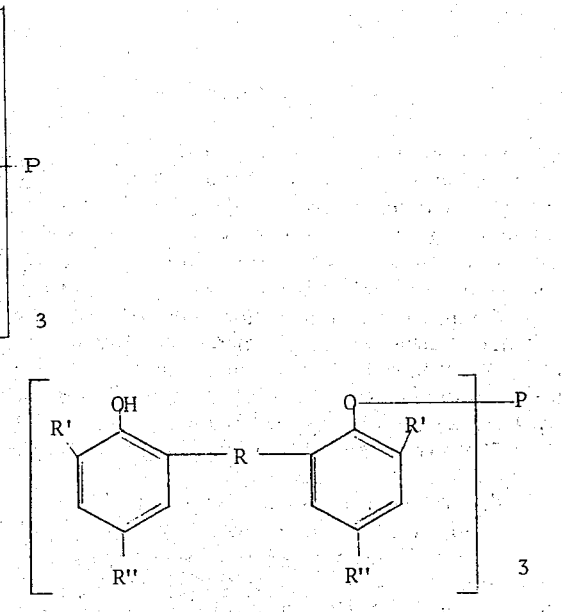

wherein R is lower alkylene and R' and R" are alkyl having from 1 to 12 carbon atoms.

8. Tris [ 2(2-hydroxy-3-t-butyl-5-methylbenzyl)-4-methyl-6-t-butylphenyl] phosphite.

* * * * *